(12) United States Patent
Lee et al.

(10) Patent No.: US 11,214,095 B2
(45) Date of Patent: Jan. 4, 2022

(54) SHEET, METHOD FOR MANUFACTURING THE SAME, AND TIRE COMPRISING THE SAME

(71) Applicant: HANKOOK TIRE CO., LTD., Seoul (KR)

(72) Inventors: Ji Wan Lee, Daejeon (KR); Mi Jung Lee, Daejeon (KR); Sung Tae Kim, Daejeon (KR); Kil Ju Ko, Daejeon (KR); Il Yong Park, Daejeon (KR); Su Hong Sung, Daejeon (KR)

(73) Assignee: HANKOOK TIRE CO., LTD.

( * ) Notice: Subject to any disclaimer, the term of this patent is extended or adjusted under 35 U.S.C. 154(b) by 125 days.

(21) Appl. No.: 16/201,966

(22) Filed: Nov. 27, 2018

(65) Prior Publication Data

US 2019/0193465 A1    Jun. 27, 2019

(30) Foreign Application Priority Data

Dec. 22, 2017    (KR) .......................... 10-2017-0177686
Dec. 26, 2017    (KR) .......................... 10-2017-0179109

(51) Int. Cl.
*B60C 9/00* (2006.01)
*B60C 1/00* (2006.01)
(Continued)

(52) U.S. Cl.
CPC ............ *B60C 9/005* (2013.01); *B60C 1/0041* (2013.01); *B60C 9/0028* (2013.01); *B60C 19/08* (2013.01); *B60C 19/084* (2013.01); *C08J 5/12* (2013.01); *C08L 7/00* (2013.01); *C08L 9/06* (2013.01); *B60C 2001/0066* (2013.01); *B60C 2019/008* (2013.01); *C08J 2307/00* (2013.01); *C08J 2309/06* (2013.01); *C08J 2407/00* (2013.01); *C08J 2409/06* (2013.01)

(58) Field of Classification Search
None
See application file for complete search history.

(56) References Cited

U.S. PATENT DOCUMENTS

2006/0021687 A1    2/2006 Dheur et al.
2010/0224298 A1*   9/2010 Rampana ............... B60C 9/005
                                          152/451

(Continued)

FOREIGN PATENT DOCUMENTS

CN    102690448 A      9/2012
CN    103012869    *   4/2013
(Continued)

OTHER PUBLICATIONS

Machine translation of DE 102010017443 (Year: 2011).*
(Continued)

*Primary Examiner* — Shawn Mckinnon
(74) *Attorney, Agent, or Firm* — Renaissance IP Law Group LLP

(57) ABSTRACT

Provided are a sheet, a method of its preparation, and a tire comprising the sheet, wherein the sheet comprises tire cords, a topping rubber for topping the tire cords, and a conductive fiber located on the surface of the topping rubber.
The sheet can provide tires, on which a rubber composition with a low electricity-transmitting property and low rolling resistance is applied, with excellent conductivity.

14 Claims, 2 Drawing Sheets

(51) Int. Cl.
*C08L 7/00* (2006.01)
*C08L 9/06* (2006.01)
*C08J 5/12* (2006.01)
*B60C 19/08* (2006.01)
*B60C 19/00* (2006.01)

(56) References Cited

U.S. PATENT DOCUMENTS

2013/0137807 A1* 5/2013 Miyazaki ............... B60C 13/00
 524/332
2017/0197480 A1 7/2017 Hoshino

FOREIGN PATENT DOCUMENTS

| DE | 102010017443 | * | 12/2011 |
| DE | 102010017443 | A1 | 12/2011 |
| EP | 1621365 | A1 | 2/2006 |
| JP | 2013193580 | * | 9/2013 |
| JP | 2013193580 | A | 9/2013 |
| JP | 2015171848 | A | 10/2015 |
| JP | 2016515492 | A | 5/2016 |
| JP | 2017124730 | A | 7/2017 |
| KR | 20140069320 | A | 6/2014 |
| KR | 20150071701 | A | 6/2015 |
| KR | 20170083735 | A | 7/2017 |
| WO | 2016204952 | A1 | 12/2016 |
| WO | 2017122509 | A1 | 7/2017 |
| WO | 2017122821 | | 7/2017 |

OTHER PUBLICATIONS

Kadlcak et al., Rapid Payne Effect Test.. (Year: 2015).*
Unikem, http://.unikemholdings.com/e_products/?10-39-1-N330. html (Year: 2020).*
Machine translation of CN103012869 (Year: 2013).*

* cited by examiner

SHEET, METHOD FOR MANUFACTURING THE SAME, AND TIRE COMPRISING THE SAME

CROSS-REFERENCE TO RELATED APPLICATION

This application claims priority to and the benefit of Korean Patent Application No. 10-2017-0177686 and 10-2017-0179109 filed in the Korean Intellectual Property Office on Dec. 22, 2017 and Dec. 26, 2017, the entire contents of which are incorporated herein by reference.

BACKGROUND

Field

The present disclosure relates to a sheet, a method of its preparation, and a tire including the sheet, and more specifically, to a sheet which can provide tires, on which a rubber composition with a low electricity-transmitting property and low rolling resistance is applied, with excellent conductivity.

Related Art

In the past, carbon-based rubber compositions had no serious problems with static electricity. However, the application of a high loading silica rubber composition is increasing with the increase on required performances on traction and reduced fuel economy of vehicles. A rubber composition with a high silica content has a problem in that it releases static electricity to the road surface.

As a method for discharging static electricity to the road surface from a tire with low rolling resistance (hereinafter, LRR), generally, the development of electrical conductivity LRR sidewall rubber composition or electrical conductivity LRR carcass rubber composition can be considered. However, it is very difficult to develop an LRR rubber composition having a resistance value of 100 MΩ or less at 1,000 V required by automobile manufacturers.

Additionally, with respect to LRR performance and electrical conductivity, it requires much time and expense to develop a rubber composition that simultaneously meet both LRR performance and electrical conductivity in trade-off relationship. In particular, since the rolling resistance of existing sidewall rubber compositions has a significant effect, when a rubber composition with an LLR property is used while giving up the ability to transmit sidewalls, it is a common practice to use a method of providing a carcass rubber composition with an electricity-transmitting property. However, to provide a carcass rubber composition with an electricity-transmitting property, it is necessary to use carbon black which increases the electricity-transmitting property and in which the structure toward the direction which the hardness or modulus of the rubber is increased is developed. However, such a method has a problem in that the processability is difficult because rubber compositions are disadvantageous to heat during the rolling process, and the use of carbon with a more advanced structure to obtain a desired electricity-transmitting property has a disadvantage in that the processability is deteriorated, and thus it is technically difficult to reconcile both the electricity-transmitting property and low rolling resistance simultaneously in real tires.

SUMMARY OF THE INVENTION

An object of the present disclosure is to provide a sheet which has a low electricity-transmitting ability and is able to provide tires, on which a rubber composition with a low electricity-transmitting property and low rolling resistance (LRR) is applied, with excellent conductivity.

Another object of the present disclosure is to provide a method for preparing the sheet.

Still another object of the present disclosure is to provide a tire including the sheet.

According to an embodiment, the present invention provides a sheet which includes tire cords; a topping rubber, which is for topping the tire cords; and a conductive fiber, which is located on the surface of the topping rubber, in which the conductive fiber contains a carbon fiber, or a fiber in which a metal is coated on the surface of at least one fiber selected from the group consisting of a synthetic fiber, a regenerated cellulose fiber, and a natural fiber.

The conductive fiber may be one in which any one fiber where the fiber on which a metal is coated or the carbon fiber is blended with any fiber selected from the group consisting of a synthetic fiber, a regenerated cellulose fiber, and a natural fiber.

The synthetic fiber may be any one selected from the group consisting of a polyester fiber, a polyamide fiber, a polyacrylonitrile fiber, and a polyurethane fiber.

The natural fiber may be any one selected from the group consisting of a hemp fiber and a cotton fiber.

The regenerated cellulose fiber may be any one selected from the group consisting of rayon and a regenerated cellulose fiber prepared using N-methylmorpholine N-oxide (NMMO).

The fiber on which a metal is coated may be a fiber, in which a metal is coated on the surface of one selected from the group consisting of a synthetic fiber, a regenerated cellulose fiber, and a natural fiber, by a method selected from the group consisting of electroplating, electroless plating, chemical vapor deposition plating, and physical vapor deposition plating.

The fiber on which a metal is coated or the carbon fiber may be blended with any one fiber selected from the group consisting of a synthetic fiber, a regenerated cellulose fiber, and a natural fiber in a weight ratio of 10:90 to 90:10.

The diameter of the conductive fiber may be from 0.05 to 0.5 mm, 5 'S to 100 'S based on spun yarn, and 50 denier to 1,000 denier based on filament yarn.

The sheet may include 1 to 60 conductive fibers.

The topping rubber may contain 100 parts by weight of a raw material rubber, which contains 20 to 50 parts by weight of a natural rubber and 50 to 80 parts by weight of a styrene butadiene rubber; and 20 to 60 parts by weight of carbon black, which has a statistical thickness surface area (STSA) value of 29 $m^2/g$ to 39 $m^2/g$, an oil absorption number of compressed sample (COAN) value of 69 cc/100 g to 79 cc/100 g, an oil absorption number of sample (OAN) value of 85 cc/100 g to 95 cc/100 g, and an iodine adsorption value of 31 mg/g to 41 mg/g.

The topping rubber may contain 100 parts by weight of a raw material rubber, which contains 10 to 40 parts by weight of a synthetic styrene butadiene rubber and 60 to 90 parts by weight of a natural rubber; 10 to 40 parts by weight of a first carbon black, which has an STSA value of 29 $m^2/g$ to 39 $m^2/g$, a COAN value of 69 cc/100 g to 79 cc/100 g, an OAN value of 85 cc/100 g to 95 cc/100 g, and an iodine adsorption value of 31 mg/g to 41 mg/g; and 20 to 50 parts by weight of a second carbon black, which has an STSA value of 70 $m^2/g$ to 80 $m^2/g$, a COAN value of 83 cc/100 g to 93 cc/100 g, an OAN value of 96 cc/100 g to 108 cc/100 g, and an iodine adsorption value of 76 mg/g to 88 mg/g.

According to another embodiment, the present invention provides a method for preparing a sheet, which includes: preparing a carbon fiber, or a fiber in which a metal is coated on the surface of at least one fiber selected from the group consisting of a synthetic fiber, a regenerated cellulose fiber, and a natural fiber; processing the fiber in which a metal is coated or the carbon fiber by texturing; preparing a conductive fiber by blending the surface of the texturing-processed fiber on which a metal is coated or carbon fiber with any one fiber selected from the group consisting of a synthetic fiber, a regenerated cellulose fiber, and a natural fiber; and topping the tire cords with a topping rubber and attaching the conductive fiber to the surface of the topping rubber at the time of rolling or cutting.

According to still another embodiment, the present disclosure provides a tire including the sheet.

DESCRIPTION OF EXEMPLARY EMBODIMENTS

Hereinafter, exemplary embodiments of the present disclosure will be described in detail so that those skilled in the art can easily carry out the present disclosure. However, the present invention may be embodied in many different forms and should not be construed as limited to the exemplary embodiments set forth herein.

In an embodiment of the present invention, the sheet may include tire cords; a topping rubber, which is for topping the tire cords; and a conductive fiber, which is located on the surface of the topping rubber.

For example, the sheet may be any one that includes tire cords which are used in tires and on which the topping rubber is applied, for example, carcass, but the present invention is not limited thereto.

Figure 1:
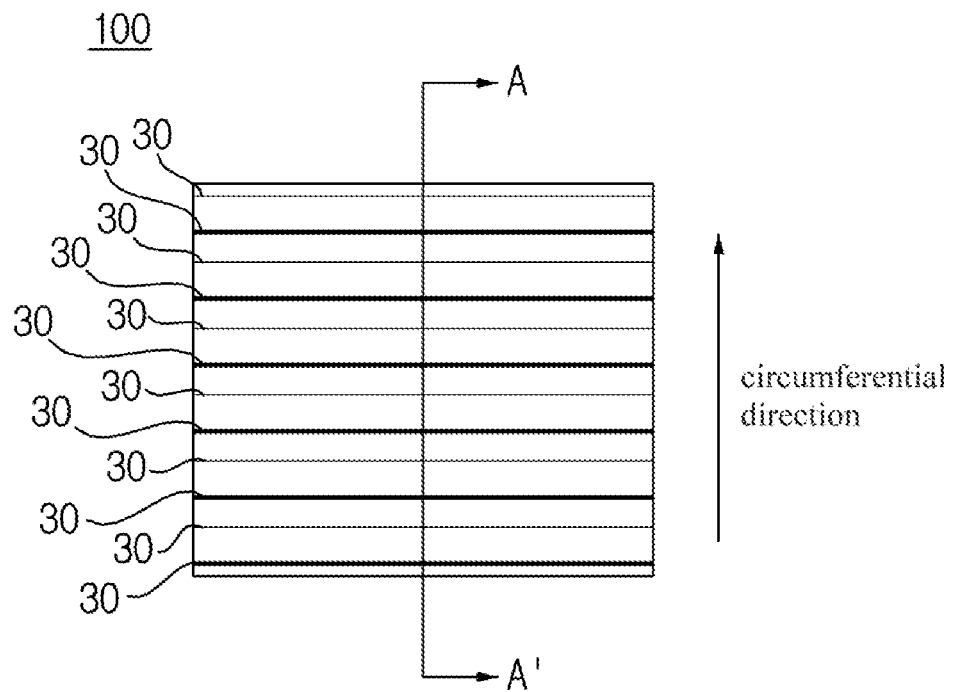
FIG. 1 is a plan view illustrating a case where a sheet according to an embodiment of the present disclosure is carcass.
Figure 2:
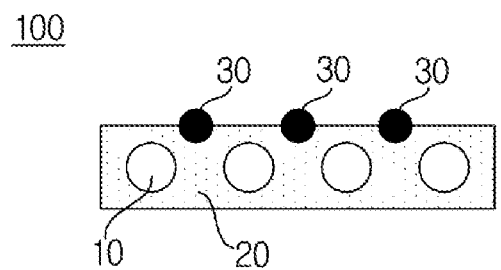
FIG. 2 is a cross-sectional view taken along line A-A' of FIG. 1.

FIG. 1 is a plan view illustrating a case where a sheet according to an embodiment of the present invention is carcass, and FIG. 2 is a cross-sectional view taken along line A-A' of FIG. 1. Hereinafter, the sheet will be explained with reference to FIGS. 1 and 2.

Referring to FIGS. 1 and 2, a sheet 100 includes tire cords 10 and a topping rubber 20 which is for topping the tire cords 10. The topping rubber 20 penetrates between the tire cords 10 while encompassing the tire cords 10 so that the sheet 100 is formed.

The tire cords 10 may be any cord for carcass generally used in tires, and a steel cord, a textile cord, etc. may be used.

Meanwhile, the sheet 100 includes a conductive fiber 30 disposed on the surface of the topping rubber 20. The sheet 100 can have conductivity through the conductive fiber 30 and can improve electrostatic performance of tires including the sheet.

In an embodiment, the conductive fiber 30 may be a fiber 30 in which a metal is coated on the surface of any one fiber selected from the group consisting of a synthetic fiber, a regenerated cellulose fiber, and a natural fiber, and in another embodiment, the conductive fiber 30 may be a carbon fiber 30.

The synthetic fiber may be any one selected from the group consisting of a polyester fiber, a polyamide fiber, a polyacrylonitrile fiber, and a polyurethane fiber. The regenerated cellulose fiber may be any one selected from the group consisting of rayon and a regenerated cellulose fiber prepared using N-methylmorpholine N-oxide (NMMO) (e.g., a lyocell fiber). The natural fiber may be any one selected from the group consisting of a hemp fiber and a cotton fiber.

The metal which is coated on the surface of any one fiber selected from the group consisting of a synthetic fiber, a regenerated cellulose fiber, and a natural fiber may be copper, silver, platinum, etc. with excellent electrical conductivity.

Meanwhile, the conductive fiber 30 may be one, in which the fiber on which a metal is coated or the carbon fiber is blended with any one fiber selected from the group consisting of a synthetic fiber, a regenerated cellulose fiber, and a natural fiber.

The conductive fiber 30, as the fiber on which a metal is coated or the carbon fiber is blended with any one fiber selected from the group consisting of a synthetic fiber, a regenerated cellulose fiber, and a natural fiber, has an advantage in that it has a good adhesion to a rolling product due to many hairs. Additionally, when only the fiber where a metal is coated or the carbon fiber is applied, it is possible to obtain excellent electrical conductivity. However, from the aspects of the cost and the workability that the fiber must be attached to the rolling product, it is desirable that a conductive fiber 30, in which the fiber on which a metal is coated or the carbon fiber is blended with any one fiber selected from the group consisting of a synthetic fiber, a regenerated cellulose fiber, and a natural fiber, be applied.

The any one fiber selected from the group consisting of a synthetic fiber, a regenerated cellulose fiber, and a natural fiber, which is blended with the fiber on which a metal is coated or the carbon fiber, is the same as described above, and thus repeated explanation is omitted here.

The blending ratio between the fiber on which a metal is coated or the carbon fiber and any one fiber selected from the group consisting of a synthetic fiber, a regenerated cellulose fiber, and a natural fiber may be in a weight ratio of 10:90 to 90:10, and specifically 40:60 to 80:20. When the blending ratio of the blended fiber exceeds the weight ratio of 10:90, the electric conductivity may be too low, whereas when the blending ratio is below the weight ratio of 90:10, the workability may be deteriorated due to high elongation when the fiber substrate on which a metal is coated is acryl or the carbon fiber, and the attachment to the rolling product may be disadvantageous and may be disadvantageous from the cost aspect.

Considering the easiness of preparation durability of tires, and conductivity performance, the diameter of the conductive fiber 30 may be 0.05 mm to 0.5 mm, 5 'S to 100 'S based on spun yarn, and 50 denier to 1,000 denier based on filament yarn. In particular, the 'S has a count of cotton yarn, metrical count, and flax count. The count of cotton yarn is called 1 'S if the yard length is 840 yards (768 m) when the weight of the cotton yarn is 1 pound (453 g). The metrical count is called 1 'S if the yard length is 1 km when the weight of the yarn is 1 kg. The flax count is called 1 'S if the yard length is 300 yards (274 m) when the weight of the yarn is 1 pound (453 g). Additionally, with respect to denier, when the weight of a filament yarn based on the length of 9,000 m is 1 g it is called 1 denier. When the diameter of the conductive fiber 30 is below 0.05 mm, exceeds 100 'S based on spun yarn, below 5 'S based on spun yarn, and below 50 denier based on filament yarn, the workability may be disadvantageous due to insufficient tensile strength, whereas when the diameter of the conductive fiber 30 exceeds 0.5 mm, below 5 'S based on spun yarn, and exceeds 1,000 denier based on filament yarn, the fiber may be too thick and thus it may act as impurities within the tire.

Considering electrostatic performance, it may be desirable to have more conductive fibers 30, however, since the conductive fiber 30 is expensive, having more conductive fibers 30 may cause an increase of the manufacturing cost and they may act as impurities inside a tire. Accordingly, the conductive fiber 30 is added to replace the air bleed yarn for removing the air between the plies in tyre existing tire, and if a minimum electrical conductivity (100 MΩ or less of resistance) can be provided in the tire, it may be considered that the intended purpose is complete. Therefore, considering the electrical conductivity and cost of tires, the conductive fiber 30 may be disposed at intervals of 10 mm to 400 mm, and specifically 50 mm to 300 mm. When the gap between the conductive fibers 30 is less than 10 mm, it will be economically inefficient and may act as impurities in a tire thereby reducing tire durability, whereas when the gap exceeds 400 mm, the desired level of electrical conductivity may not be secured.

The sheet 100 may include 1 to 60 conductive fibers 30. When the conductive fiber 30 is less than 1, at least one conductive fiber 30 cannot be added per tire being manufactured thus not being able to secure electrical conductivity, whereas when the conductive fiber 30 exceeds 60, it is economically inefficient and an excess number of the conductive fibers may cause a problem with respect to tire durability.

The conductive fiber 30 may be located on both sides of the topping rubber 20 as well as on one side of the topping rubber 20. When the conductive fiber 30 is located only on one side of the topping rubber 20, the conductive fiber 30 may be located on one side where the sheet 100 faces the inner liner.

The conductive fiber 30 may be disposed at any angle or direction with respect to tire cords 10. When the sheet 100 is mounted on the tire, it may also be used as a structure that can improve rigidity and durability of the tire, in addition to the tire cords 10 which disposed obliquely or vertically with respect to the circumferential direction of the tire and wound in the circumferential direction. Accordingly, the acute angle of the angle formed by the tire cords 10 and the conductive fiber 30 may be 0° to 90°. Additionally, the conductive fiber 30 may be of a straight or wavy shape extending from the surface of the topping rubber 20.

However, the conductive fiber 30 which extends to both ends of the topping rubber 20 and is exposed at both ends of the topping rubber 20 can further improve electrostatic performance and is thus desirable.

As the sheet 100 effectively releases static electricity concentrated on a tire to the road surface, the tire including the sheet 100 may have a resistance value of 0.1 M MΩ to 100 MΩ at a voltage of 1,000 V. In order for the tire to have a resistance value of less than 0.1 MΩ at a voltage of 1,000 V, there are many other trade off items. For example, it may be disadvantageous to rolling resistance (LRR) by further application of an electricity-transmittable compound or excessive use of conductive fibers, whereas when the resistance value exceeds 100 MΩ, it may not be possible to release static electricity.

The sheet 100 can effectively move the static electricity being delivered from a vehicle to the tread part of a tire and thereby deliver it to the ground. As a result, the electrical conductivity can be imparted to parts other than the composition of the rubber composition, the freedom of development for LRR of the carcass topping rubber composition and sidewall rubber composition can be increased. That is, as the requirement for electrical conductivity with respect to the sidewall rubber composition and the carcass topping rubber composition is reduced, a rubber composition for improving rolling resistance can be applied, and eventually, tires for reducing fuel economy with LRR can be manufactured while resolving the static electricity problem by the application of the conductive fiber 30.

Therefore, as the topping rubber 20, any topping rubber for textile cords generally used for dashes may be applicable. However, as the topping rubber 20, the one which has the composition with an excellent LRR property containing 20 to 60 parts by weight of carbon black, with a large particle size and less-developed structure, with respect to 100 parts by weight of a raw material rubber, which contains 20 to 50 parts by weight of a natural rubber and 50 to 80 parts by weight of a styrene butadiene rubber. When the composition of the topping rubber 20 is prepared as described above, it has advantages in that the composition contains a styrene butadiene rubber and is thus effective in adhesion; and as carbon black with a less-developed structure is used, the internal heat generation is reduced thus being useful for rolling resistance; and as the weight parts of the carbon black is less, the heat generation is reduced. A tire, even when it contains the topping rubber 20 with the above composition, can have a resistance value of 0.1 MΩ to 100 MΩ at a voltage of 1,000 V because it contains the sheet 100. The carbon black with a large particle size and a less-developed structure may be one which has a statistical thickness surface area (STSA) value of 29 $m^2/g$ to 39 $m^2/g$, an oil absorption number of compressed sample (COAN) value of 69 cc/100 g to 79 cc/100 g, an oil absorption number of sample (OAN) value of 85 cc/100 g to 95 cc/100 g, and an iodine adsorption value of 31 mg/g to 41 mg/g.

Even then, the topping rubber 20 may be a topping rubber composition with an electricity-transmitting property for further improvement of electrical conductivity of the sheet 100. The topping rubber composition with an electricity-transmitting property may have a composition, which contains 10 to 40 parts by weight of a first carbon black, with a relatively large particle size and a relatively less-developed structure, and 20 to 50 parts by weight of a second carbon black, with a relatively small particle size and a relatively well-developed structure, with respect to 100 parts by weight of a raw material rubber, which contains 10 to 40 parts by weight of a synthetic styrene butadiene rubber and 60 to 90 parts by weight of a natural rubber. The first carbon black, with a relatively large particle size and a relatively less-developed structure, may be one which has an STSA value of 29 $m^2/g$ to 39 $m^2/g$, a COAN value of 69 cc/100 g to 79 cc/100 g, an OAN value of 85 cc/100 g to 95 cc/100 g, and an iodine adsorption value of 31 mg/g to 41 mg/g. The second carbon black, with a relatively small particle size and a relatively well-developed structure, may be one which has an STSA value of 70 $m^2/g$ to 80 $m^2/g$, a COAN value of 83 cc/100 g to 93 cc/100 g, an OAN value of 96 cc/100 g to 108 cc/100 g, and an iodine adsorption value of 76 mg/g to 88 mg/g.

Additionally, as the sidewall rubber, a rubber composition having characteristics of a low electricity-transmitting property and a low rolling resistance (LRR) may be applied. The sidewall rubber may have a composition, which contains 20 to 70 parts by weight of carbon black, with a large particle size and less-developed structure, with respect to 100 parts by weight of a raw material rubber, which contains 30 to 70 parts by weight of a natural rubber and 30 to 70 parts by weight of a synthetic butadiene rubber. When the sidewall rubber is formed as described above, heat generation can be reduced and excellent fuel economy can be provided and is thus desirable. A tire, even when it contains the sidewall rubber with the above composition, can have a resistance value of 0.1 MΩ to 100 MΩ at a voltage of 1,000 V because it contains the sheet 100. The carbon black with a large particle size and a less-developed structure may be one which has an STSA value of 29 $m^2$/g to 39 $m^2$/g, a COAN value of 69 cc/100 g to 79 cc/100 g, an OAN value of 85 cc/100 g to 95 cc/100 g, and an iodine adsorption value of 31 mg/g to 41 mg/g.

Meanwhile, the sidewall rubber 20 may be a topping rubber composition with an electricity-transmitting property for further improvement of electrical conductivity of the tire. The sidewall rubber composition with an electricity-transmitting property may have a composition, which contains 10 to 40 parts by weight of a first carbon black, with a relatively large particle size and a relatively less-developed structure, and 10 to 30 parts by weight of a third carbon black, with a relatively small particle size and a relatively very well-developed structure, with respect to 100 parts by weight of a raw material rubber, which contains 30 to 70 parts by weight of a natural rubber and 30 to 70 parts by weight of a synthetic butadiene rubber. The first carbon black, with a relatively large particle size and a relatively less-developed structure, may be one which has an STSA value of 29 $m^2$/g to 39 $m^2$/g, a COAN value of 69 cc/100 g to 79 cc/100 g, an OAN value of 85 cc/100 g to 95 cc/100 g, and an iodine adsorption value of 31 mg/g to 41 mg/g. The third carbon black, with a relatively small particle size and a relatively very well-developed structure, may be one which has an STSA value of 118 $m^2$/g to 129 $m^2$/g, a COAN value of 91 cc/100 g to 101 cc/100 g, an OAN value of 108 cc/100 g to 118 cc/100 g, and an iodine adsorption value of 150 mg/g to 165 mg/g.

A method for preparing the sheet 100 according to another embodiment of the present invention includes: preparing a carbon fiber, or a fiber in which a metal is coated on the surface of at least one fiber selected from the group consisting of a synthetic fiber, a regenerated cellulose fiber, and a natural fiber; processing the fiber in which a metal is coated or the carbon fiber by texturing; preparing a conductive fiber by blending the surface of the texturing-processed fiber on which a metal is coated or carbon fiber with any one fiber selected from the group consisting of a synthetic fiber, a regenerated cellulose fiber, and a natural fiber; and topping the tire cords with a topping rubber and attaching the conductive fiber to the surface of the topping rubber at the time of rolling or cutting.

First, the carbon fiber or the fiber in which a metal is coated is prepared.

The fiber in which a metal is coated may be prepared by immersing any one fiber selected from the group consisting of the synthetic fiber, regenerated cellulose fiber, and natural fiber in an electrolytic solution containing a metal salt followed by electroplating or electroless plating; or a metal may be coated on the surface of the fiber by the physical vapor deposition method or chemical vapor deposition method.

In an embodiment, the fiber where copper is coated may be prepared by immersing any one fiber selected from the group consisting of the synthetic fiber, regenerated cellulose fiber, and natural fiber in an electrolytic solution containing a metal salt (copper sulfate, etc.) followed by electroplating or electroless plating; or a metal may be coated on the surface of the fiber by the physical vapor deposition method or chemical vapor deposition method.

Then, the carbon fiber or the fiber on which a metal is coated is texturing-processed.

The reason for the processing of texturing the carbon fiber or the fiber on which a metal is coated is to promote a smooth blending by providing a crimp through the texturing process because a spinning is performed for a blending after the preparation of a sliver through carding and combing, and it is difficult to perform spinning for a long filament fiber with strong linearity even after cutting the fiber to a certain length.

As the processing method for texturing, all of the commonly known methods (e.g., false-twist method, stuffer-box method, air-jet texturing method, etc.) may be used. Among these methods, the false-twist method may be used as the representative method, and the stuffer-box method may be appropriately used in the case of a thermoplastic fiber.

The texturing-processed carbon fiber or the fiber on which a metal is coated may be blended with any one fiber selected from the group consisting of a synthetic fiber, a regenerated cellulose fiber, and a natural fiber, after the preparation of a short fiber (staple fiber) by cutting the texturing-processed carbon fiber or the fiber on which a metal is coated to a length of 1 cm to 5 cm. If a filament-type long fiber is used as the carbon fiber or the fiber on which a metal is coated, instead of the short fiber, there are several disadvantages in that there is a difficulty in mechanical adhesion at the time of attaching the conductive fiber to the surface of the topping rubber and the conductive fiber may be separated during the process.

Then, a conductive fiber may be prepared by blending the texturing-processed carbon fiber or the fiber on which a metal is coated with any one fiber selected from the group consisting of a synthetic fiber, a regenerated cellulose fiber, and a natural fiber.

With respect to the method for blending the carbon fiber or the fiber on which a metal is coated with any one fiber selected from the group consisting of a synthetic fiber, a regenerated cellulose fiber, and a natural fiber, the techniques for blending several kinds of fibers during the manufacture of tire cords are already well known, and thus the above blending can be performed without any difficulty.

Finally, after the topping of the tire cords with a topping rubber, the conductive fiber is attached to the surface of the topping rubber at the time of rolling or cutting.

Specifically, the conductive fiber may be attached to the surface of the sheet in any arbitrary part of the process between immediately after the sheet passed through a calendar and a winding process of the rolling product. In particular, as the attachment method, the conductive fiber may be supplied to the surface of the rolled sheet in progress and simultaneously the conductive fiber is pressed using a roller, etc.; the position for the attachment of the conductive fiber is fixed by mounting a fiber guide (yarn guide), and then the conductive fiber is attached according to the movement of the rolled sheet, etc. may be used. As the facility for the attachment, the conventional attachment facility of air bleed yarn may be utilized.

Figure 3:
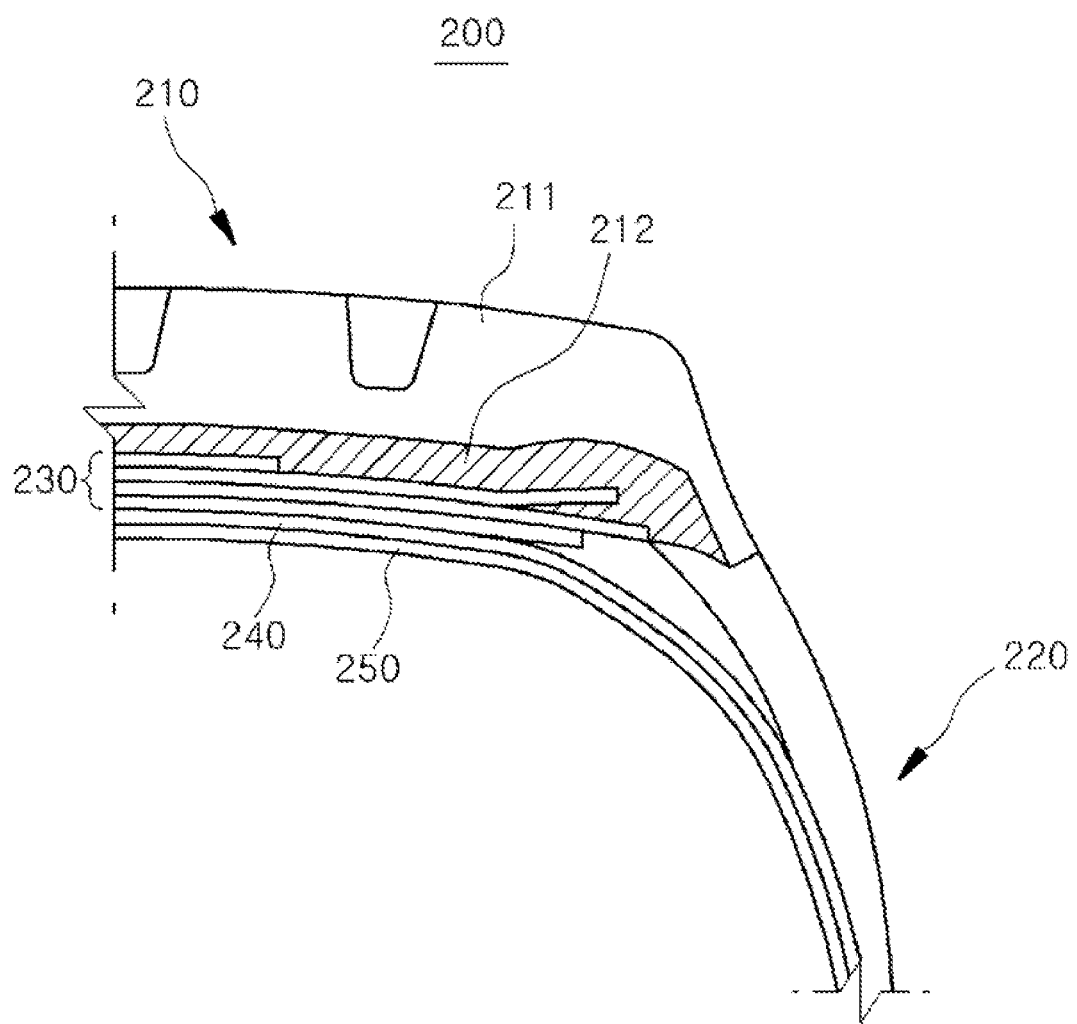
FIG. 3 is a cross-sectional view schematically illustrating a cross section of a tire according to another embodiment of the present disclosure.

The tire according to still another embodiment of the present invention includes the sheet 100. FIG. 3 is a cross-sectional view schematically illustrating a cross section of the tire.

Referring to FIG. 3, the tire 200 includes a tread part 210, a sidewall part 220, a belt part 230, a carcass part 240, and an inner liner part 250, but the structure of the tire 200 is not limited thereto, and all of the conventional tire structures may be applied.

The tread part 210, which is the part where a tire comes in direct contact with the ground, delivers the driving force and the braking force of a vehicle to the surface of the road and it may include a captread 211 and an undertread 212. The sidewall 220 serves as an intermediate position for protecting the carcass part 240 from an external shock and transmitting the movement of the steering wheel to the tread part 210 via heads (not shown). The belt part 230 may include a constitution which consists of a belt for controlling the grip road surface forces, handling, etc.; a reinforcement cap fly for preventing separation between the steel belt layers; a belt cushion, etc. The carcass part 240 serves as a skeleton for forming the backbone of a tire, and maintains the air pressure together with the inner liner 250 to support an externally applied load. The inner liner 250 maintains the air pressure inside of a tire.

In particular, the sheet 100 is applicable to the carcass part 240. When the tire 200 includes the sheet 100 in the carcass part 240, the static electricity generated in a vehicle is transmitted to the sidewall 220 through the wheels of the vehicle, and released to the ground while passing through the belt part 230, the carcass part 240, and the tread part 210.

Meanwhile, the tire 200 may be preferably a tire for a passenger vehicle, but the tire of the present disclosure is not limited thereto, and the tire may be a passenger vehicle tire, a light truck tire, a SUV tire, an off-the-road tire, a bias truck tire, a bias bus tire, etc. Additionally, the tire 200 may be a radial tire or bias tire.

Hereinafter, exemplary embodiments of the present invention will be described in detail so that those skilled in the art can easily carry out the present invention. However, the present invention may be embodied in many different forms and should not be construed as being limited to the embodiments set forth herein.

Example 1

After selecting the tire 225/45R17 standard as shown in Tables 1 and 2 below, carcasses were prepared using a general cotton material fiber in Examples 1-1 to 1-3, and using a copper-coated conductive fiber in Examples 1-1 and 1-7. In Comparative Examples 1-1 to 1-3 and Examples 1-1 to 1-7, 8 fibers were used per tire.

TABLE 1

| Category | Comparative Example 1-1 | Example 1-1 | Example 1-2 | Example 1-3 | Example 1-4 |
|---|---|---|---|---|---|
| Standard | 225/45R17 | 225/45R17 | 225/45R17 | 225/45R17 | 225/45R17 |
| Applied Area | carcass surface | carcass surface | carcass surface | carcass surface | carcass surface |
| Applied Fiber | cotton material 30's spun yarn | copper-electroplated 30's polyurethane-based spun yarn | copper-electroplated 150 denier polyurethane-based filament yarn | copper-electroplated 30's Nylon66 spun yarn | copper-electroplated 30's rayon-based spun yarn |
| Carcass topping Rubber Composition[1] | general rubber composition (non-electricity-transmittable) | general rubber composition (non-electricity-transmittable) | general rubber composition (non-electricity-transmittable) | general rubber composition (non-electricity-transmittable) | general rubber composition (non-electricity-transmittable) |
| Sidewall Rubber Composition[2] | general rubber composition (electricity-transmittable) | general rubber composition (electricity-transmittable) | general rubber composition (electricity-transmittable) | general rubber composition (electricity-transmittable) | general rubber composition (electricity-transmittable) |

1) carcass topping rubber composition: a general rubber composition with a non-electricity-transmitting property comprised of 70 parts by weight of carbon black with a characteristic of a large particle size and a less-developed structure, with respect to 100 parts by weight of a raw material rubber containing 70 parts by weight of a natural rubber. The carbon black with a large particle size and a less-developed structure is one which has an STSA value of 34 $m^2/g$, a COAN value of 74 cc/100 g, an OAN value of 90 cc/100 g, and an iodine adsorption value of 36 mg/g.

2) sidewall rubber composition: a rubber composition with an electricity-transmitting property comprised of 30 parts by weight of a first carbon black, with a relatively large particle size and a relatively less-developed structure, and 20 parts by weight of a third carbon black, with a relatively small particle size and a relatively well-developed structure, with respect to 100 parts by weight of a raw material rubber, which contains 70 parts by weight of a natural rubber and 30 parts by weight of a synthetic butadiene rubber. The first carbon black with a relatively large particle size and a relatively less-developed structure is carbon black which has an STSA value of 34 $m^2/g$, a COAN value of 74 cc/100 g, an OAN value of 90 cc/100 g, and an iodine adsorption value of 36 mg/g. The third carbon black with a relatively small particle size and a relatively well-developed structure is carbon black which has an STSA value of 123 $m^2/g$, a COAN value of 96 cc/100 g, an OAN value of 113 cc/100 g, and an iodine adsorption value of 160 mg/g.

TABLE 2

| Category | Comparative Example 1-2 | Comparative Example 1-3 | Example 1-5 | Example 1-6 | Example 1-7 |
|---|---|---|---|---|---|
| Standard | 225/45R17 | 225/45R17 | 225/45R17 | 225/45R17 | 225/45R17 |
| Applied Area | carcass surface | carcass surface | carcass surface | carcass surface | carcass surface |

TABLE 2-continued

| Category | Comparative Example 1-2 | Comparative Example 1-3 | Example 1-5 | Example 1-6 | Example 1-7 |
|---|---|---|---|---|---|
| Applied Fiber | cotton material 30's spun yarn | cotton material 30's spun yarn | copper-electroplated 30's polyurethane-based spun yarn | copper-electroplated 30's Nylon66 spun yarn | copper-electroplated 30's rayon-based spun yarn |
| Carcass topping Rubber Composition[1] | LRR rubber composition (non-electricity-transmittable) | rubber composition (electricity-transmittable) | LRR rubber composition (non-electricity-transmittable) | LRR rubber composition (non-electricity-transmittable) | LRR rubber composition (non-electricity-transmittable) |
| Sidewall Rubber Composition[2] | LRR rubber composition (non-electricity-transmittable) | rubber composition (electricity-transmittable) | LRR rubber composition (non-electricity-transmittable) | LRR rubber composition (non-electricity-transmittable) | LRR rubber composition (non-electricity-transmittable) |

1) carcass topping rubber composition (LRR rubber composition): an LRR rubber composition with a characteristic of a large particle size and a less-developed structure, with respect to 100 parts by weight of a raw material rubber containing 70 parts by weight of an emulsion polymerization stadiene rubber and 30 parts by weight of a natural rubber. The carbon black with a large particle size and a less-developed structure is one which has an STSA value of 34 $m^2$/g, a COAN value of 74 cc/100 g, an OAN value of 90 cc/100 g, and an iodine adsorption value of 36 mg/g. The carbon black with a large particle size and a less-developed structure has an STSA value of 34 $m^2$/g, a COAN value of 74 cc/100 g, an OAN value of 90 cc/100 g, and an iodine adsorption value of 36 mg/g.

carcass topping rubber composition (electricity-transmittable LRR rubber composition): An electricity-transmittable topping rubber composition with an-electricity-transmitting property comprised of 30 parts by weight of a first carbon black, with a relatively large particle size and a relatively less-developed structure, and 40 parts by weight of a second carbon black, with a relatively small particle size and a relatively well-developed structure, with respect to 100 parts by weight of a raw material rubber, which contains 30 parts by weight of a synthetic butadiene rubber and 70 parts by weight of a natural rubber. The first carbon black with a relatively large particle size and a relatively less-developed structure is carbon black which has an STSA value of 34 $m^2$/g, a COAN value of 74 cc/100 g, an OAN value of 90 cc/100 g, and an iodine adsorption value of 36 mg/g. The second carbon black with a relatively small particle size and a relatively well-developed structure is carbon black which has an STSA value of 75 $m^2$/g, a COAN value of 88 cc/100 g, an OAN value of 102 cc/100 g, and an iodine adsorption value of 82 mg/g.

2) sidewall rubber composition (LRR rubber composition): an LRR rubber composition comprised of 50 parts by weight of a carbon black-filling material with a large particle size and a less-developed structure with respect to 100 parts by weight of a raw material rubber, which contains 50 parts by weight of a natural rubber and 50 parts by weight of a synthetic butadiene rubber. The carbon black with a large particle size and a less-developed structure is one which has an STSA value of 34 $m^2$/g, a COAN value of 74 cc/100 g, an OAN value of 90 cc/100 g, and an iodine adsorption value of 36 mg/g.

sidewall rubber composition (electricity-transmittable rubber composition): a rubber composition with an excellent electricity-transmitting property comprised of 30 parts by weight of a first carbon black, with a relatively large particle size and a relatively less-developed structure, and 20 parts by weight of a third carbon black, with a relatively small particle size and a relatively well-developed structure, with respect to 100 parts by weight of a raw material rubber, which contains 70 parts by weight of a natural rubber and 30 parts by weight of a synthetic butadiene rubber.

The first carbon black with a relatively large particle size and a relatively less-developed structure is carbon black which has an STSA value of 34 $m^2$/g, a COAN value of 74 cc/100 g, an OAN value of 90 cc/100 g, and an iodine adsorption value of 36 mg/g. The third carbon black with a relatively small particle size and a relatively well-developed structure is carbon black which has an STSA value of 123 $m^2$/g, a COAN value of 96 cc/100 g, an OAN value of 113 cc/100 g, and an iodine adsorption value of 160 mg/g.

Experimental Example 1

The electricity-transmitting ability and durability of the tires prepared in Example 1 were measured and the results are shown in Tables 3 and 4 below.

TABLE 3

| Category | Comparative Example 1-1 | Example 1-1 | Example 1-2 | Example 1-3 | Example 1-4 |
|---|---|---|---|---|---|
| Electrical Resistance (measured on tire) | 90 MΩ | 1 MΩ | 0.5 MΩ | 0.9 MΩ | 2.0 MΩ |
| High Speed Durability | 100 min | 100 min | 100 min | 100 min | 100 min |

TABLE 3-continued

| Category | Comparative Example 1-1 | Example 1-1 | Example 1-2 | Example 1-3 | Example 1-4 |
| --- | --- | --- | --- | --- | --- |
| General Durability | 60 hr | 60 hr | 60 hr | 60 hr | 60 hr |
| Long-term Durability | 400 hr | 400 hr | 400 hr | 400 hr | 400 hr |
| RRc (Index) | 100 | 100 | 100 | 95 | 95 |

TABLE 4

| Category | Comparative Example 1-2 | Comparative Example 1-3 | Example 1-5 | Example 1-6 | Example 1-7 |
| --- | --- | --- | --- | --- | --- |
| Electrical Resistance (measured on tire) | 29.9 GΩ | 60 MΩ | 15 MΩ | 20 MΩ | 21 MΩ |
| High Speed Durability | 100 min | 100 min | 100 min | 100 min | 100 min |
| General Durability | 60 hr | 60 hr | 60 hr | 60 hr | 60 hr |
| Long-term Durability | 400 hr | 400 hr | 400 hr | 400 hr | 400 hr |
| RRc (Index) | 95 | 105 | 95 | 95 | 95 |

In Tables 3 and 4 above, the electrical resistance was measured such that a voltage of 1,000 V was applied to the ground contacting part and rim part of tires and thereby the resistance was measured. The high speed durability, general durability, and long-term durability were measured under the conditions of 140%, 80 km/h relative to Load Index. The rolling resistance (RRc) was measured by the ISO 20580 method, and Comparative Example 1-1 was indexed as 100, and a lower value indicates more excellent.

Referring to Tables 3 and 4 above, the electrical resistance of Examples 1-1 to 1-4 was lower than that of Comparative Example 1-1 thus confirming that the electricity-transmitting ability was improved. Additionally, in the cases of Examples 1-1 to 1-4, there were no changes in durability and rolling resistance (RR) despite the improvement of electricity-transmitting ability.

Additionally, comparing Comparative Examples 1-2 and 1-3, it was confirmed that when the LRR rubber composition was applied as the carcass topping rubber composition and the sidewall rubber composition, the electricity-transmitting ability was significantly reduced. Meanwhile, in the cases of Examples 1-5 to 1-7, even when the LRR rubber composition was applied as the carcass topping rubber composition and the sidewall rubber composition, the electricity-transmitting ability was improved. Additionally, in the cases of Examples 1-5 to 1-7, there were no changes in durability and rolling resistance (RR) despite the improvement of electricity-transmitting ability.

Example 2

After selecting the tire 225/45R17 standard as shown in Tables 5 and 6 below, carcasses were prepared using a general cotton material fiber in Examples 2-1 to 2-3, and using a copper-coated conductive fiber in Examples 2-1 and 2-7. In Comparative Examples 2-1 to 2-3 and Examples 2-1 to 2-7, 8 fibers were used per tire.

TABLE 5

| Category | Comparative Example 2-1 | Example 2-1 | Example 2-2 | Example 2-3 | Example 2-4 |
| --- | --- | --- | --- | --- | --- |
| Standard | 225/45R17 | 225/45R17 | 225/45R17 | 225/45R17 | 225/45R17 |
| Applied Area | carcass surface | carcass surface | carcass surface | carcass surface | carcass surface |
| Applied Fiber | cotton material 30's spun yarn | 20's fiber where copper-electroplated a polyacrylonitrile fiber and a cotton fiber are blended in a 2:8 weight ratio | 20's fiber where copper-electroplated a polyacrylonitrile fiber and a cotton fiber are blended in a 4:6 weight ratio | 20's fiber where copper-electroplated a polyacrylonitrile fiber and a cotton fiber are blended in a 6:4 weight ratio | 30's fiber where copper-electroplated a polyacrylonitrile fiber and a cotton fiber are blended in a 6:4 weight ratio |
| Carcass topping Rubber Composition[1] | general rubber composition (non-electricity-transmittable) | general rubber composition (non-electricity-transmittable) | general rubber composition (non-electricity-transmittable) | general rubber composition (non-electricity-transmittable) | general rubber composition (non-electricity-transmittable) |

TABLE 5-continued

| Category | Comparative Example 2-1 | Example 2-1 | Example 2-2 | Example 2-3 | Example 2-4 |
|---|---|---|---|---|---|
| Sidewall Rubber Composition[2] | general rubber composition (electricity-transmittable) | general rubber composition (electricity-transmittable) | general rubber composition (electricity-transmittable) | general rubber composition (electricity-transmittable) | general rubber composition (electricity-transmittable) |

1) carcass topping rubber composition: a general rubber composition with a non-electricity-transmitting property comprised of 70 parts by weight of carbon black with a characteristic of a large particle size and a less-developed structure, with respect to 100 parts by weight of a raw material rubber containing 70 parts by weight of a natural rubber. The carbon black with a large particle size and a less-developed structure is one which has an STSA value of 34 $m^2/g$, a COAN value of 74 cc/100 g, an OAN value of 90 cc/100 g, and an iodine adsorption value of 36 mg/g.

2) sidewall rubber composition: a rubber composition with an electricity-transmitting property comprised of 30 parts by weight of a first carbon black, with a relatively large particle size and a relatively less-developed structure, and 20 parts by weight of a third carbon black, with a relatively small particle size and a relatively well-developed structure, with respect to 100 parts by weight of a raw material rubber, which contains 70 parts by weight of a natural rubber and 30 parts by weight of a synthetic butadiene rubber. The first carbon black with a relatively large particle size and a relatively less-developed structure is carbon black which has an STSA value of 34 $m^2/g$, a COAN value of 74 cc/100 g, an OAN value of 90 cc/100 g, and an iodine adsorption value of 36 mg/g. The third carbon black with a relatively small particle size and a relatively well-developed structure is carbon black which has an STSA value of 123 $m^2/g$, a COAN value of 96 cc/100 g, an OAN value of 113 cc/100 g, and an iodine adsorption value of 160 mg/g.

stadiene rubber and 30 parts by weight of a natural rubber. The carbon black with a large particle size and a less-developed structure is one which has an STSA value of 34 $m^2/g$, a COAN value of 74 cc/100 g, an OAN value of 90 cc/100 g, and an iodine adsorption value of 36 mg/g. The carbon black with a large particle size and a less-developed structure has an STSA value of 34 $m^2/g$, a COAN value of 74 cc/100 g, an OAN value of 90 cc/100 g, and an iodine adsorption value of 36 mg/g.

carcass topping rubber composition (electricity-transmittable LRR rubber composition): An electricity-transmittable topping rubber composition with an-electricity-transmitting property comprised of 30 parts by weight of a first carbon black, with a relatively large particle size and a relatively less-developed structure, and 40 parts by weight of a second carbon black, with a relatively small particle size and a relatively well-developed structure, with respect to 100 parts by weight of a raw material rubber, which contains 30 parts by weight of a synthetic butadiene rubber and 70 parts by weight of a natural rubber. The first carbon black with a relatively large particle size and a relatively less-developed structure is carbon black which has an STSA value of 34 $m^2/g$, a COAN value of 74 cc/100 g, an OAN value of 90 cc/100 g, and an iodine adsorption value of 36 mg/g. The second carbon black with a relatively small particle size and a relatively well-developed structure is carbon black which has an STSA value of 75 $m^2/g$, a COAN value of 88 cc/100 g, an OAN value of 102 cc/100 g, and an iodine adsorption value of 82 mg/g.

TABLE 6

| Category | Comparative Example 2-2 | Comparative Example 2-3 | Example 2-5 | Example 2-6 | Example 2-7 |
|---|---|---|---|---|---|
| Standard Applied Area | 225/45R17 carcass surface | 225/45R17 carcass surface | 225/45R17 carcass surface | 225/45R17 carcass surface | 225/45R17 carcass surface |
| Applied Fiber | cotton material 30's spun yarn | cotton material 30's spun yarn | 20's fiber where copper-electroplated a polyacrylonitrile fiber and a cotton fiber are blended in a 4:6 weight ratio | 20's fiber where copper-electroplated a polyacrylonitrile fiber and a cotton fiber are blended in a 6:4 weight ratio | 30's fiber where copper-electroplated a polyacrylonitrile fiber and a cotton fiber are blended in a 6:4 weight ratio |
| Carcass topping Rubber Composition[1] | LRR rubber composition (non-electricity-transmittable) | rubber composition (electricity-transmittable) | LRR rubber composition (non-electricity-transmittable) | LRR rubber composition (non-electricity-transmittable) | LRR rubber composition (non-electricity-transmittable) |
| Sidewall Rubber Composition[2] | LRR rubber composition (non-electricity-transmittable) | rubber composition (electricity-transmittable) | LRR rubber composition (non-electricity-transmittable) | LRR rubber composition (non-electricity-transmittable) | LRR rubber composition (non-electricity-transmittable) |

1) carcass topping rubber composition (LRR rubber composition): an LRR rubber composition with a characteristic of a large particle size and a less-developed structure, with respect to 100 parts by weight of a raw material rubber containing 70 parts by weight of an emulsion polymerization 2) sidewall rubber composition (LRR rubber composition): an LRR rubber composition comprised of 50 parts by weight of a carbon black with a large particle size and a less-developed structure with respect to 100 parts by weight of a raw material rubber, which contains 50 parts by weight of a natural rubber and 50 parts by weight of a synthetic butadiene rubber. The carbon black with a large particle size and a less-developed structure is one which has an STSA value of 34 m$^2$/g, a COAN value of 74 cc/100 g, an OAN value of 90 cc/100 g, and an iodine adsorption value of 36 mg/g.

sidewall rubber composition (electricity-transmittable rubber composition): a rubber composition with an excellent electricity-transmitting property comprised of 30 parts by weight of a first carbon black, with a relatively large particle size and a relatively less-developed structure, and 20 parts by weight of a third carbon black, with a relatively small particle size and a relatively well-developed structure, with respect to 100 parts by weight of a raw material rubber, which contains 70 parts by weight of a natural rubber and 30 parts by weight of a synthetic butadiene rubber.

The first carbon black with a relatively large particle size and a relatively less-developed structure is carbon black which has an STSA value of 34 m$^2$/g, a COAN value of 74 cc/100 g, an OAN value of 90 cc/100 g, and an iodine adsorption value of 36 mg/g. The third carbon black with a relatively small particle size and a relatively well-developed structure is carbon black which has an STSA value of 123 m$^2$/g, a COAN value of 96 cc/100 g, an OAN value of 113 cc/100 g, and an iodine adsorption value of 160 mg/g.

Experimental Example 2

The electricity-transmitting ability and durability of the tires prepared in Example 2 were measured and the results are shown in Tables 7 and 8 below.

resistance was measured. The high speed durability, general durability, and long-term durability were measured under the conditions of 140%, 80 km/h relative to Load Index. The rolling resistance (RRc) was measured by the ISO 20580 method, and Comparative Example 2-1 was indexed as 100, and a lower value indicates more excellent.

Referring to Tables 7 and 8 above, the electrical resistance of Examples 2-1 to 2-4 was lower than that of Comparative Example 2-1 thus confirming that the electricity-transmitting ability was improved. Additionally, in the cases of Examples 2-1 to 2-4, there were no changes in durability and rolling resistance (RR) despite the improvement of electricity-transmitting ability.

Additionally, comparing Comparative Examples 2-2 and 2-3, it was confirmed that when the LRR rubber composition was applied as the carcass topping rubber composition and the sidewall rubber composition, the electricity-transmitting ability was significantly reduced. Meanwhile, in the cases of Examples 2-5 to 2-7, even when the LRR rubber composition was applied as the carcass topping rubber composition and the sidewall rubber composition, the electricity-transmitting ability was improved. Additionally, in the cases of Examples 2-5 to 2-7, there were no changes in durability and rolling resistance (RR) despite the improvement of electricity-transmitting ability.

Effects of the Invention

The sheet of the present disclosure can provide tires, on which a rubber composition with a low electricity-transmitting property and low rolling resistance is applied, with excellent conductivity.

TABLE 7

| Category | Comparative Example 2-1 | Example 2-1 | Example 2-2 | Example 2-3 | Example 2-4 |
| --- | --- | --- | --- | --- | --- |
| Electrical Resistance (measured on tire) | 29.9 GΩ | 10 MΩ | 1 MΩ | 0.5 MΩ | 2.0 MΩ |
| High Speed Durability | 100 min | 100 min | 100 min | 100 min | 100 min |
| General Durability | 60 hr | 60 hr | 60 hr | 60 hr | 60 hr |
| Long-term Durability | 400 hr | 400 hr | 400 hr | 400 hr | 400 hr |
| RRc (Index) | 100 | 100 | 100 | 95 | 95 |

TABLE 8

| Category | Comparative Example 2-2 | Comparative Example 2-3 | Example 2-5 | Example 2-6 | Example 2-7 |
| --- | --- | --- | --- | --- | --- |
| Electrical Resistance (measured on tire) | 29.9 GΩ | 50 MΩ | 10 MΩ | 7.0 MΩ | 15.1 MΩ |
| High Speed Durability | 100 min | 100 min | 100 min | 100 min | 100 min |
| General Durability | 60 hr | 60 hr | 60 hr | 60 hr | 60 hr |
| Long-term Durability | 400 hr | 400 hr | 400 hr | 400 hr | 400 hr |
| RRc (Index) | 95 | 105 | 95 | 95 | 95 |

In Tables 7 and 8 above, the electrical resistance was measured such that a voltage of 1,000 V was applied to the ground contacting part and rim part of tires and thereby the While the invention has been described with reference to exemplary embodiments, will be apparent to those skilled in the art that various modifications may be made without

CODE EXPLANATION

100: sheet
10: tire cords
20: topping rubber
30: conductive fiber
200: tire
210: tread part
211: captread        212: undertread
220: sidewall part
230: belt part
240: carcass part
250: inner liner part

What is claimed is:

1. A sheet, comprising:
   tire cords;
   a topping rubber, which is for topping the tire cords; and
   a conductive fiber, which is located on the topping rubber,
   wherein the conductive fiber comprises a carbon fiber, or a fiber in which a metal is coated on at least one fiber selected from the group consisting of a first synthetic fiber, a first regenerated cellulose fiber, and a first natural fiber,
   wherein the carbon fiber is blended with any fiber selected from the group consisting of a second synthetic fiber, a second regenerated cellulose fiber, and a second natural fiber,
   wherein the topping rubber comprises composition (a) or composition (b),
   wherein composition (a) includes:
   100 parts by weight of a raw material rubber, which comprises 20 to 50 parts by weight of a natural rubber and 50 to 80 parts by weight of a styrene butadiene rubber; and
   20 to 60 parts by weight of carbon black, which has a statistical thickness surface area (STSA) value of 29 m²/g to 39 m²/g, an oil absorption number of compressed sample (COAN) value of 69 cc/100 g to 79 cc/100 g, an oil absorption number of sample (OAN) value of 85 cc/100 g to 95 cc/100 g, and an iodine adsorption value of 31 mg/g to 41 mg/g, and
   wherein composition (b) includes:
   100 parts by weight of a raw material rubber, which comprises 10 to 40 parts by weight of a synthetic styrene butadiene rubber and 60 to 90 parts by weight of a natural rubber,
   10 to 40 parts by weight of a first carbon black, which has an STSA value of 29 m2/g to 39 m2/g, a COAN value of 69 cc/100 g to 79 cc/100 g, an OAN value of 85 cc/100 g to 95 cc/100 g, and an iodine adsorption value of 31 mg/g to 41 mg/g, and
   20 to 50 parts by weight of a second carbon black, which has an STSA value of 70 m2/g to 80 m2/g, a COAN value of 83 cc/100 g to 93 cc/100 g, an OAN value of 96 cc/100 g to 108 cc/100 g, and an iodine adsorption value of 76 mg/g to 88 mg/g.

2. The sheet of claim 1,
   wherein each of the first and second synthetic fiber is one selected from the group consisting of a polyester fiber, a polyamide fiber, a polyacrylonitrile fiber, and a polyurethane fiber.

3. The sheet of claim 1,
   wherein each of the first and second natural fiber is one selected from the group consisting of a hemp fiber and a cotton fiber.

4. The sheet of claim 1,
   wherein each of the first and second regenerated cellulose fiber is one selected from the group consisting of rayon and a regenerated cellulose fiber prepared using N-methylmorpholine N-oxide (NMMO).

5. The sheet of claim 1,
   wherein the fiber on which a metal is coated is a fiber, in which a metal is coated on one selected from the group consisting of a synthetic fiber, a regenerated cellulose fiber, and a natural fiber, by a method selected from the group consisting of electroplating, electroless plating, chemical vapor deposition plating, and physical vapor deposition plating.

6. The sheet of claim 1,
   wherein the fiber on which a metal is coated or the carbon fiber is blended with any one fiber selected from the group consisting of a synthetic fiber, a regenerated cellulose fiber, and a natural fiber in a weight ratio of 10:90 to 90:10.

7. The sheet of claim 1,
   wherein a diameter of the conductive fiber is selected from the group consisting of 0.05 mm to 0.5 mm, 5 'S to 100 'S based on spun yarn, and 50 denier to 1,000 denier based on filament yarn.

8. The sheet of claim 1,
   wherein the sheet comprises 1 to 60 conductive fibers.

9. A method for preparing a sheet, comprising:
   preparing a first fiber,
   wherein the first fiber is a carbon fiber or a fiber in which a metal is coated on at least one fiber selected from the group consisting of a synthetic fiber, a regenerated cellulose fiber, and a natural fiber;
   processing the first fiber by texturing;
   preparing a conductive fiber by blending the texturing-processed fiber with any one fiber selected from the group consisting of a synthetic fiber, a regenerated cellulose fiber, and a natural fiber; and
   topping tire cords with a topping rubber and attaching the conductive fiber to the topping rubber at a time of rolling or cutting,
   wherein the topping rubber comprises composition (a) or composition (b),
   wherein composition (a) includes:
   100 parts by weight of a raw material rubber, which comprises 20 to 50 parts by weight of a natural rubber and 50 to 80 parts by weight of a styrene butadiene rubber; and
   20 to 60 parts by weight of carbon black, which has a statistical thickness surface area (STSA) value of 29 m²/g to 39 m²/g, an oil absorption number of compressed sample (COAN) value of 69 cc/100 g to 79 cc/100 g, an oil absorption number of sample (OAN) value of 85 cc/100 g to 95 cc/100 g, and an iodine adsorption value of 31 mg/g to 41 mg/g, and wherein composition (b) includes:
- 100 parts by weight of a raw material rubber, which comprises 10 to 40 parts by weight of a synthetic styrene butadiene rubber and 60 to 90 parts by weight of a natural rubber,
- 10 to 40 parts by weight of a first carbon black, which has an STSA value of 29 $m^2/g$, to 39 $m^2/g$, a COAN value of 69 cc/100 g to 79 cc/100 g, an OAN value of 85 cc/100 g to 95 cc/100 g, and an iodine adsorption value of 31 mg/g to 41 mg/g, and
- 20 to 50 parts by weight of a second carbon black, which has an STSA value of 70 $m^2/g$ to 80 $m^2/g$, a COAN value of 83 cc/100 g to 93 cc/100 g, an OAN value of 96 cc/100 g to 108 cc/100 g, and an iodine adsorption value of 76 mg/g to 88 mg/g.

10. A tire comprising the sheet of claim 1.

11. The sheet of claim 1, wherein the tire cords are surrounded by the topping rubber.

12. The sheet of claim 1, wherein the conductive fiber is partially embedded within the topping rubber.

13. The sheet of claim 1, wherein the conductive fiber is oriented relative to the tire cords at an acute angle.

14. The sheet of claim 1, wherein the conductive fiber is oriented parallel to the tire cords.

* * * * *